(12) United States Patent
Bednekoff (10) Patent No.: US 6,741,839 B1
(45) Date of Patent: May 25, 2004

(54) SYSTEM AND METHOD FOR MONITORING ADJACENT CHANNEL POWER IN A WIRELESS BASE STATION (75) Inventor: George A. Bednekoff, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/397,190

(22) Filed: Sep. 16, 1999

(51) Int. Cl.[7] ................................................ H04B 1/04
(52) U.S. Cl. .................. 455/114.2; 455/424; 455/67.13
(58) Field of Search ................................ 455/423, 424, 455/501, 63, 66, 67.3, 67.4, 67.7, 103, 126, 43, 66.1, 67.11, 67.13, 561, 114.2–115.1; 375/227, 296; 370/290, 291

(56) References Cited

U.S. PATENT DOCUMENTS

| 5,808,463 | A | * | 9/1998 | Nagano | 324/76.21 |
| 6,043,706 | A | * | 3/2000 | Nowak et al. | 330/2 |
| 6,101,218 | A | * | 8/2000 | Nagano | 375/224 |
| 6,112,059 | A | * | 8/2000 | Schwent et al. | 455/67.1 |
| 6,263,289 | B1 | * | 7/2001 | Hassun et al. | 702/69 |
| 6,349,216 | B1 | * | 2/2002 | Alberth, Jr. et al. | 455/550 |
| 6,438,356 | B1 | * | 8/2002 | Lilja et al. | 455/63 |
| 6,546,233 | B1 | * | 4/2003 | Aleiner et al. | 455/126 |

* cited by examiner

Primary Examiner—Charles Craver (57) ABSTRACT

There is disclosed an ACP monitoring circuit for use in a wireless network comprising a plurality of base stations for communicating with a plurality of mobile devices. Each of the plurality of base stations comprises an RF transmitter that receives an input baseband signal and an RF carrier signal and produces a modulated RF output signal that is then amplified. The ACP monitoring circuit monitors adjacent channel power (ACP) noise in the RF output signal. The ACP monitoring circuit comprises: 1) an RF mixer having a first input receiving the RF output signal and a second input receiving the RF carrier signal and produces a scaled output signal on an output of the RF mixer; and 2) a first power detection circuit coupled to the RF mixer output that determines a power level of the ACP noise outside an allocated channel bandwidth of the RF transmitter.

14 Claims, 5 Drawing Sheets

SYSTEM AND METHOD FOR MONITORING ADJACENT CHANNEL POWER IN A WIRELESS BASE STATION

TECHNICAL FIELD OF THE INVENTION

The present invention is directed, in general, to wireless communications systems and, more specifically, to a system for monitoring adjacent channel power in a base station transmitter in a wireless communication network.

BACKGROUND OF THE INVENTION

Reliable predictions indicate that there will be over 300 million cellular telephone customers by the year 2000. Within the United States, cellular service is offered by cellular service providers, by the regional Bell companies, and by the national long distance operators. The enhanced competition has driven the price of cellular service down to the point where it is affordable to a large segment of the population.

To maximize usage of the available bandwidth, a number of multiple access technologies have been implemented to allow more than one subscriber to communicate simultaneously with each base transceiver station (BTS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

In order to further increase the number of subscribers that can be serviced in a single wireless network, frequency reuse is maximized by making individual cell sites smaller and using a greater number of cell sites to cover the same geographical area. Accordingly, the greater number of base transceiver stations increases infrastructure costs. To offset this increased cost, wireless service providers are eager to implement any innovations that may reduce equipment costs, maintenance and repair costs, and operating costs, or that may increase service quality and reliability and the number of subscribers that the cellular system can service.

Every wireless network base station has an RF power amplifier for transmitting voice and/or data signals to mobile units (i.e., cell phones, portable computers equipped with cellular modems, pagers, and the like) and a receiver for receiving voice and/or data signals from the mobile units. The FCC requires an RF power amplifier (PA) to be operated in such a manner that the adjacent channel power (ACP) noise (distortion) remains under certain limits (i.e., a mask) defined in a standard (i.e., ACP profile). ACP is the ratio of adjacent channel power in a specified bandwidth to the power of the desired transmitter output.

To ensure that the ACP profiles of network base stations remain within tolerance, wireless service providers frequently measure the RF output power and signal quality of each base station transmitter. However, the test equipment used typically includes a spectrum analyzer that costs far more that the base station transmitter itself. Due to this great cost, the test equipment rarely is implemented as part of the base station itself. Instead, maintenance crews transport the test equipment from cell site to cell site to perform ACP profile tests. Unfortunately, this does not provide real-time monitoring of ACP noise and distortion products in a wireless network. RF transmitters that are out-of-tolerance are not detected until a maintenance crew finally tests the equipment.

There is therefore a need in the art for test equipment that may be implemented as part of the base station. In particular, there is a need for test equipment that provides continuous monitoring of adjacent channel power (ACP) noise in wireless network base stations. More particularly, there is a need for ACP monitoring equipment that is reliable, adds the minimum amount of cost to a base station, and provides a remote monitoring capability for ACP noise.

SUMMARY OF THE INVENTION

To address the above-discussed deficiencies of the prior art, it is a primary object of the present invention to provide an ACP monitoring circuit for use in a wireless network comprising a plurality of base stations capable of communicating with a plurality of mobile devices, wherein each of the plurality of base stations comprises an RF transmitter capable of receiving an input baseband signal and an RF carrier signal and producing therefrom an amplified modulated RF output signal. In an advantageous embodiment of the present invention, the ACP monitoring circuit, capable of monitoring adjacent channel power (ACP) noise in the RF output signal, comprises: 1) an RF mixer having a first input capable of receiving the RF output signal and a second input capable of receiving the RF carrier signal and producing therefrom a scaled output signal on an output of the RF mixer; and 2) a first power detection circuit coupled to the RF mixer and capable of determining a power level of the ACP noise outside an allocated channel bandwidth of the RF transmitter.

In one embodiment of the present invention, the ACP monitoring circuit further comprises a filter coupled to the RF mixer for isolating the ACP noise, wherein the first power detection circuit measures the power level of the ACP noise at an output of the filter.

In another embodiment of the present invention, the ACP monitoring circuit further comprises a second power detection circuit coupled to the RF mixer and capable of determining a power level of the RF output signal in the allocated channel bandwidth of the RF transmitter.

In still another embodiment of the present invention, the ACP monitoring circuit further comprises a filter coupled to the RF mixer for isolating the RF output signal, wherein the second power detection circuit measures the power level of the RF output signal at an output of the filter.

In yet another embodiment of the present invention, the ACP monitoring circuit further comprises: 1) a first filter coupled to the RF mixer for isolating the ACP noise; and 2) a second filter coupled to the RF mixer for isolating the RF output signal, wherein the first power detection circuit measures the power level of the ACP noise at an output of the first filter and measures a power level of the RF output signal in the allocated channel bandwidth of the RF transmitter at an output of the second filter.

In a further embodiment of the present invention, the ACP monitoring circuit further comprises a switch having a first input coupled to the first filter output, a second input coupled to the second filter output, and an output coupled to the first power detection circuit.

In a still further embodiment of the present invention, the ACP monitoring circuit further comprises at least one bandpass filter coupled to the RF mixer for isolating the ACP noise, wherein the first power detection circuit measures the power level of the ACP noise in a first selected frequency band at an output of the bandpass filter.

In a yet further embodiment of the present invention, the ACP monitoring circuit further comprises a plurality of bandpass filters coupled to the RF mixer for isolating the ACP noise, wherein the first power detection circuit measures the power level of the ACP noise in a plurality of selected frequency bands at an output of the bandpass filter.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
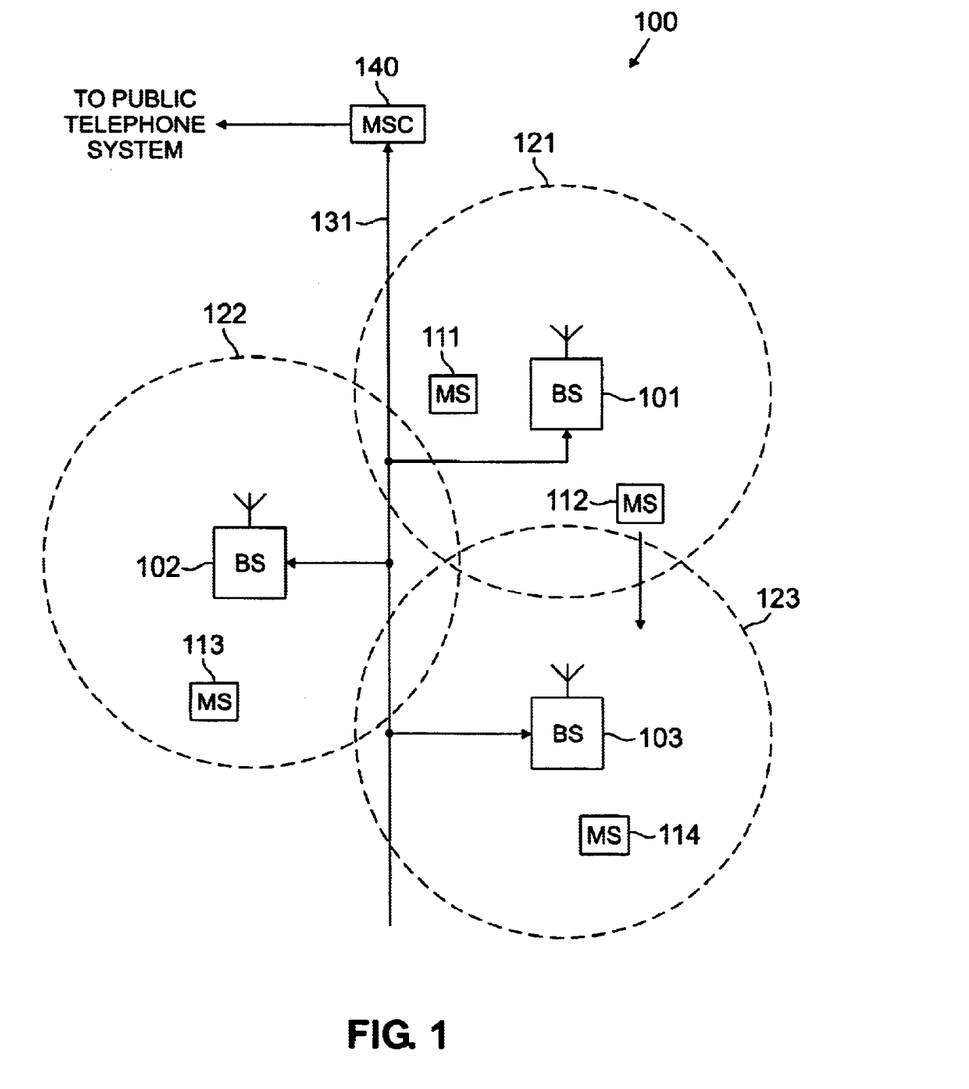
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cell sites 121–123 in which base stations 101–103 are located. The cell sites are shown approximately circular for the purposes of illustration and explanation only. It should be clearly understood that the cell sites may have other shapes, depending on the cell configuration selected and natural and man-made obstructions.

In one embodiment of the present invention, each of BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
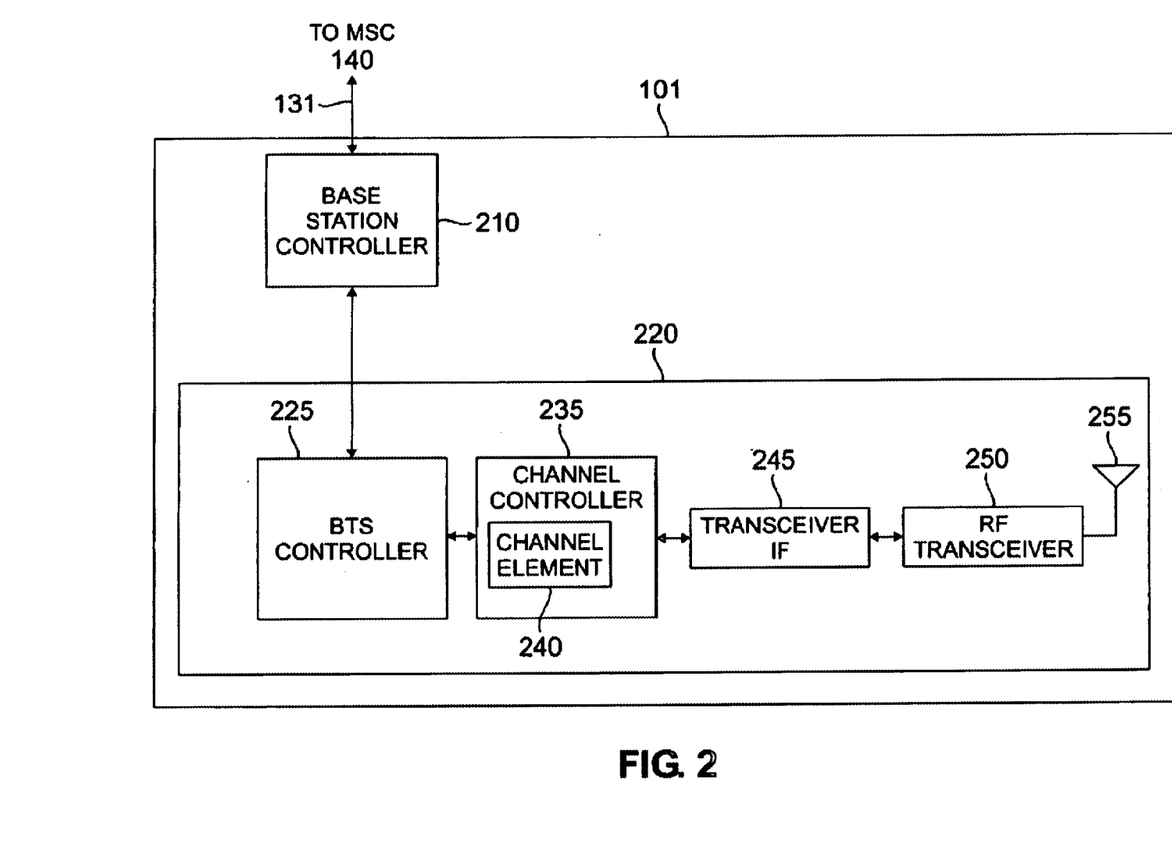
FIG. 2 illustrates in greater detail an exemplary base station in accordance with one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235, which contains representative channel element 240, transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements operate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three sector antenna in which each antenna sector is responsible for transmitting and receiving in a 120° arc of coverage area. Additionally, transceiver 250 may contain an antenna selection unit to select among different antennas in antenna array 255 during both transmit and receive operations.

In an advantageous embodiment of the present invention, the transmitters in RF transceiver unit 250 comprise variable-power RF amplifiers that are capable of varying the amplitude of the RF output signal transmitted by base station 101. In so doing, the RF amplifiers in the transmitters may occasionally produces distortion signals (or distortion products) in the adjacent channels. To monitor this condition, the present invention provides inexpensive means for remotely monitoring the ACP profile of a base station transmitter. For the purpose of simplicity, the ACP distortion products generated by the RF amplifier(s) described below may be referred to as ACP "noise" signals or ACP "distortion" signals.

Figure 3:
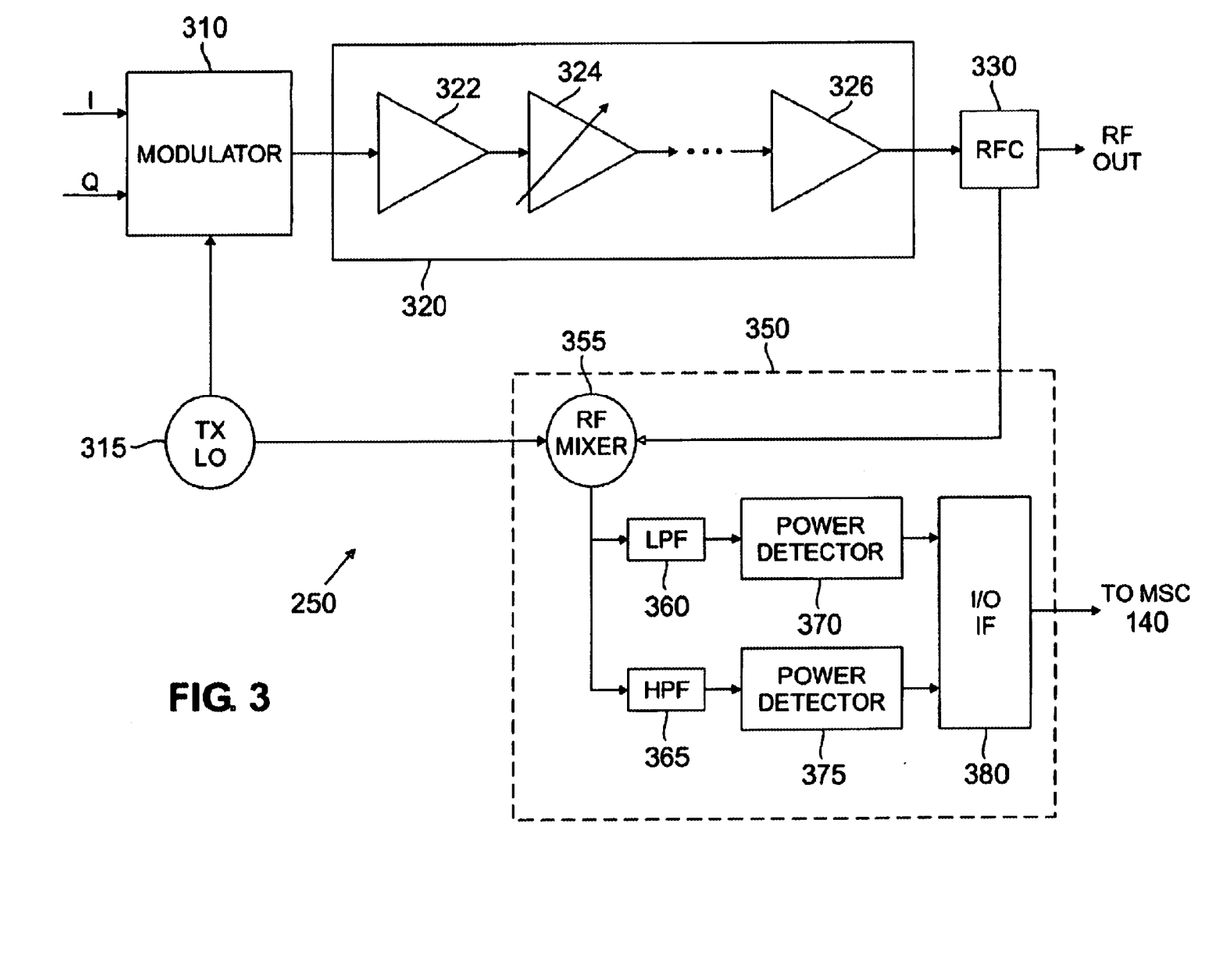
FIG. 3 illustrates in greater detail an exemplary RF transceiver incorporating an exemplary adjacent channel power measurement circuit in accordance with one embodiment of the present invention.

FIG. 3 illustrates in greater detail exemplary RF transceiver unit 250 in accordance with one embodiment of the present invention. The transmit path of exemplary RF transceiver unit 250 comprises modulator 310, transmitter local oscillator (TX LO) 315, power amplification stage 320, and RF coupler (RFC) 330. RF transceiver unit 250 also comprises ACP measurement circuit 350.

Modulator 310 receives an in-phase (I) baseband signal and a quadrature (Q) baseband signal from channel element 240 and uses them to modulate an RF carrier signal provided by TX LO 310 to produce a modulated RF output signal. The RF carrier signal produced by TX LO 310 is a stable single frequency signal in the 1930–1990 MHz range used for exemplary CDMA transmissions. This same TX LO reference signal is used by ACP measurement circuit 350.

Power amplification stage 320 amplifies the RF spread spectrum output from modulator 305 to produce the required power level for broadcast to the cell site through RFC 330 and antenna array 255. Power amplification stage 320 comprises a first power amplifier 322, second power amplifier 324, which may include an automatic gain control adjustment circuit, and perhaps one or more additional power amplifiers, such as power amplifier 326. Power amplifier 322 amplifies the output of modulator 310 to an intermediate power level. Power amplifier 324 and any succeeding power amplifiers, including power amplifier 326 continue to amplify the output of power amplifier 322 until the desired RF output power level is reached for output to RFC 330. RFC 330 transmits one copy of the RF output signal, RF OUT to RF antenna array 255 and transmits another copy of the RF OUT signal to ACP measurement circuit 350.

Exemplary ACP measurement circuit 350 receives the RF OUT signal from RFC 330 and creates an intermediate frequency (IF) measurement signal for output to MSC 140. Exemplary ACP measurement circuit 350 comprises RF mixer 355, low pass filter (LPF) 360, high pass filter (HPF) 365, power detectors 370 and 375, and input/output interface (I/O IF) circuit 380. RF mixer 355 down-converts the RF OUT signal by mixing it with the 1930–1990 MHz carrier signal from TX LO 315 to recover a baseband representation of the original I and Q signals. The down-converted baseband signal also contains adjacent channel noise (distortion) signals produced by the amplification of the I and Q signals.

LPF 360 and HPF 365 receive the resultant baseband and noise signals from RF mixer 355 and filter them to produce desired signals for use in measuring ACP characteristics. LPF 360 filters out the unwanted ACP signals to present the desired I and Q components to power detector 370. HPF 365 filters out the I and Q components to present the ACP signal components to power detector 375. Power detectors 370 and 375, which may be simple peak detectors, measure the relative amplitudes of the desired baseband signals and the undesired ACP noise signals.

Subsequently, I/O IF 380 receives the power level outputs from power detectors 370 and 375 and calculates the ratio of the power of the undesired distortion signal (power detector 375 output) to the desired signal components (power detector 370 output). The ratio determined by I/O IF 380 provides a continuous measurement of ACP. I/O IF 380 subsequently converts the ACP measurement to the form required for input to MSC 140. For instance, one, embodiment for I/O IF 380 is an analog-to-digital converter which provides an digital output representation of the ACP measurement.

In an alternate embodiment of the present invention, a switch may couple the outputs of LPF 360 and HPF 365 to a single, common power detector, thereby simplifying the circuit by eliminating the need for one power detector.

Figure 4:
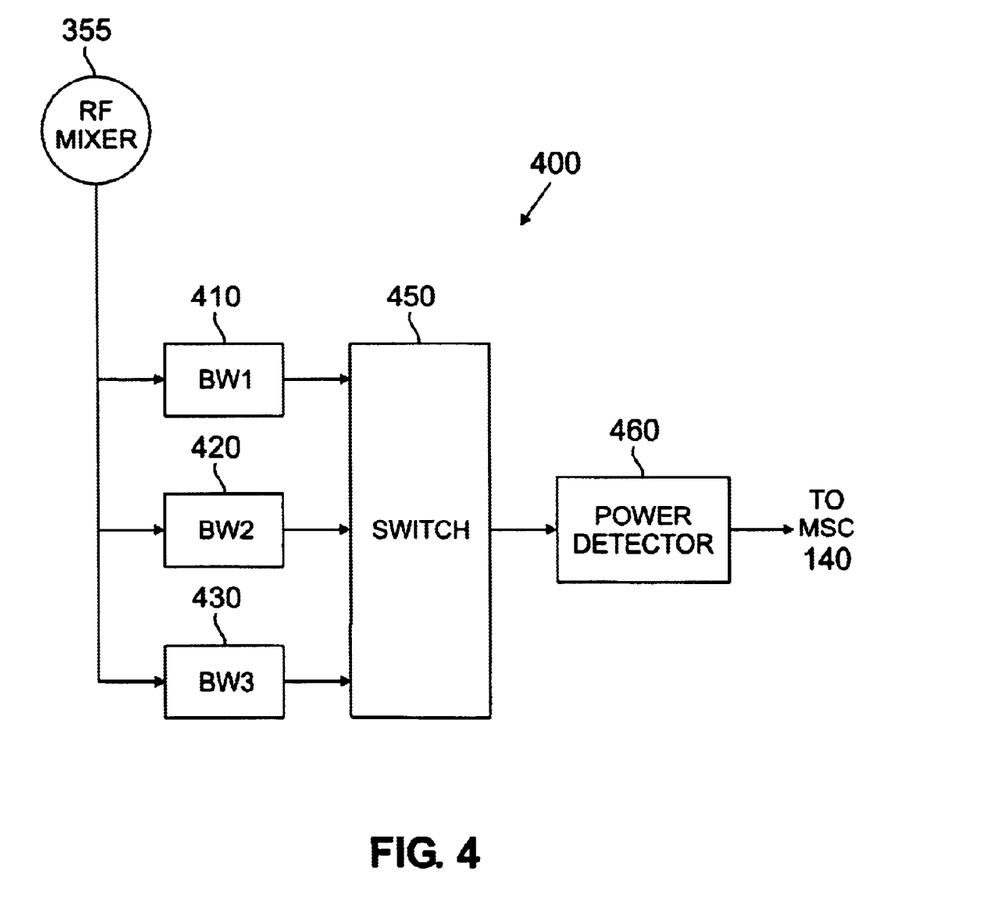
FIG. 4 illustrates in greater detail an exemplary bandwidth power measurement circuit in accordance with another embodiment of the present invention.

FIG. 4 is an illustration of an exemplary ACP measurement circuit 400 in accordance with an alternate embodiment of the present invention. ACP measurement circuit 400, which may be used to replace ACP measurement circuit 350, comprises RF mixer 355, bandpass filters 410, 420 and 430 (hereafter referred to respectively as "BW1," "BW2" and "BW3"), switch 450, and power detector 460. Again, RF mixer 355 down-converts the RF OUT signal by mixing it with the 1930–1990 MHz carrier signal from TX LO 315 to recover a baseband representation of the original I and Q signals. The down-converted baseband signal also contains adjacent channel noise (distortion) signals produced by the amplification of the I and Q signals.

Next, each of BW1, BW2, and BW3 filter the output of RF mixer 355. Each of BW1–BW3 provides an output which represents either the desired baseband signals or a selected frequency range of the ACP noise. Switch 450 then selectively switches the outputs of BW1–BW3 to power detector 460, which measures the power level in each bandpass and provides an output to MSC 140 indicating the measured power level in each bandpass. Thus, a greater amount of information regarding the amount of ACP noise in different frequency bands can be analyzed.

Figure 5:
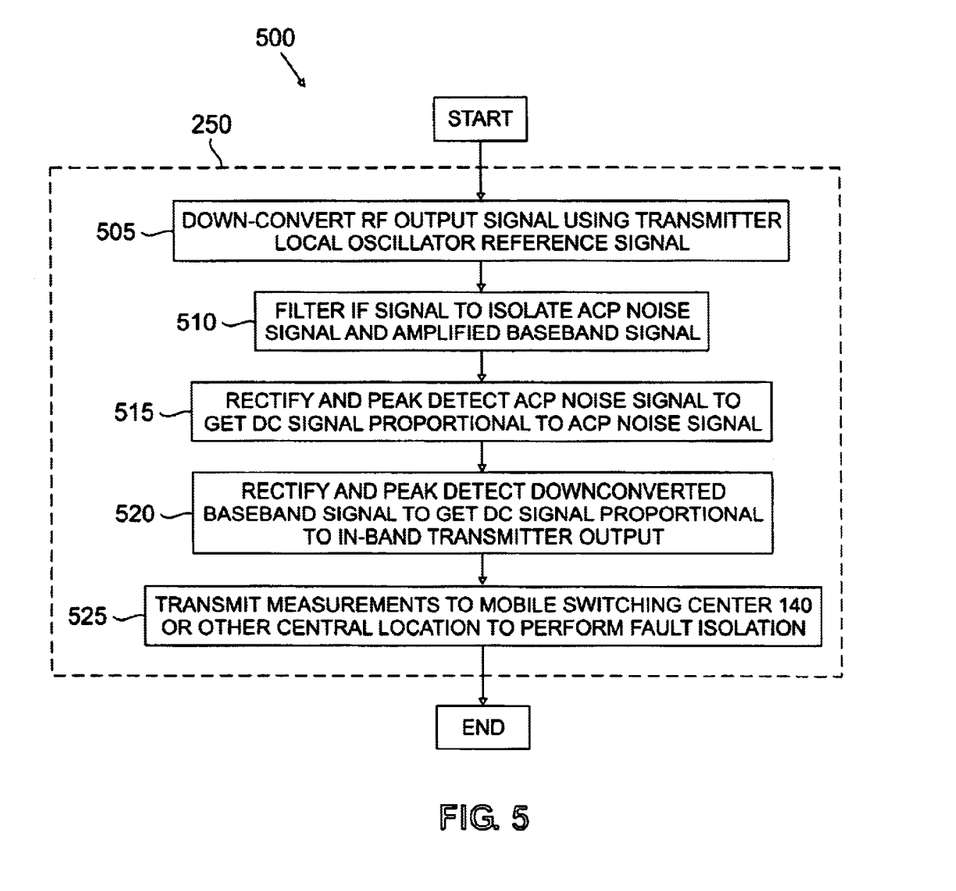
FIG. 5 is a flow diagram illustrating the operation of the exemplary RF transceiver in accordance with one embodiment of the present invention.

FIG. 5 depicts flow diagram 500, which illustrates the operation of the exemplary RF transceiver 250 in accordance with one embodiment of the present invention. RF mixer 355 down-converts the copied RF output signal from RFC 330 using the carrier frequency from TX LO 315 as its reference signal (process step 505). HPF 365 isolates the ACP noise signal from the down-converted signal and LPF 360 isolates the amplified baseband frequency from the down-converted signal (process step 510). Subsequently, power detector 375 rectifies and detects the peak power of the ACP noise signal to generate an output DC signal which is proportional to the ACP noise portion of RF OUT from RFC 330 (process step 515). Similarly, power detector 370 provides an output DC signal which is proportional to the desired baseband (in-band) output of RFC 330 (process step 520). I/O IF 380 receives the power measurement signals from power detectors 370 and 375 and converts them to an output signal which is compatible with interfaces to MSC 140 or any other central location which performs fault isolation processes (process step 525).

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations capable of communicating with a plurality of mobile devices, each of the plurality of base stations comprising an RF transmitter capable of receiving an input baseband signal and an RF carrier signal and producing therefrom an amplified modulated RF output signal, an ACP monitoring circuit for monitoring adjacent channel power (ACP) noise in the RF output signal comprising:

an RF mixer having a first input capable of receiving the RF output signal and a second input capable of receiving the RF carrier signal and producing therefrom a recovered baseband signal on an output of the RF mixer, the recovered baseband signal comprising a desired baseband signal and the ACP noise;

a first power detection circuit capable of determining a power level of the ACP noise outside an allocated channel bandwidth of the RF transmitter;

a first filter coupled to the RF mixer for isolating the ACP noise;

a second filter coupled to the RF mixer for isolating the desired baseband signal, wherein the first power detection circuit measures the power level of the ACP noise at an output of the first filter and measures a power level of the desired baseband signal in the allocated channel bandwidth of the RF transmitter at an output of the second filter; and a switch having a first input coupled to said first filter output, a second input coupled to said second filter output, and an output coupled to said first power detection circuit.

2. The ACP monitoring circuit set forth in claim 1, wherein at least one of the first and second filters comprises at least one bandpass filter.

3. The ACP monitoring circuit set forth in claim 1, wherein the first and second filters comprise bandpass filters.

4. A wireless network capable of communicating with a plurality of mobile stations located in a coverage area of the wireless network, the wireless network comprising a plurality of base stations, at least one of the base stations comprising:

an RF transmitter capable of receiving an input baseband signal and an RF carrier signal and producing therefrom an amplified modulated RF output signal; and an ACP monitoring circuit for monitoring adjacent channel power (ACP) noise in the RF output signal comprising:

an RF mixer having a first input capable of receiving the RF output signal and a second input capable of receiving the RF carrier signal and producing therefrom a recovered baseband signal, the recovered baseband signal comprising a desired baseband signal and the ACP noise;

a first power detection circuit capable of determining a power level of the ACP noise outside an allocated channel bandwidth of the RF transmitter;

a first filter coupled to the RF mixer for isolating the ACP noise;

a second filter coupled to the RF mixer for isolating the desired baseband signal, wherein the first power detection circuit measures the power level of the ACP noise at an output of the first filter and measures a power level of the desired baseband signal in the allocated channel bandwidth of the RF transmitter at an output of the second filter; and a switch having a first input coupled to said first filter output, a second input coupled to said second filter output, and an output coupled to said first power detection circuit.

5. The wireless network set forth in claim 4, wherein at least one of the first and second filters comprises at least one bandpass filter.

6. The wireless network set forth in claim 4, wherein the first and second filters comprise bandpass filters.

7. For use in a base station comprising a transmitter capable of producing an output signal using an input baseband signal and a carrier signal, an adjacent channel power (ACP) monitoring circuit comprising:

a mixer capable of receiving the output signal and the carrier signal and generating a recovered baseband signal using the output signal and the carrier signal, the recovered baseband signal comprising a desired signal and ACP noise;

a first filter coupled to the mixer and capable of isolating the ACP noise in the recovered baseband signal;

a second filter coupled to the mixer and capable of isolating the desired signal in the recovered baseband signal;

a switch coupled to the first filter and the second filter and capable of selectively outputting one of the isolated ACP noise and the isolated desired signal; and a power detection circuit coupled to the switch and capable of measuring a power level of the isolated ACP noise and measuring a power level of the isolated desired signal.

8. The ACP monitoring circuit of claim 7, wherein:

the first filter comprises a high-pass filter; and the second filter comprises a low-pass filter.

9. The ACP monitoring circuit of claim 7, wherein at least one the first and second filters comprises one or more bandpass filters.

10. The ACP monitoring circuit of claim 7, further comprising an interface circuit capable of receiving the measured power levels and calculating a ratio of the power level of the isolated ACP noise to the power level of the isolated desired signal.

11. A wireless network capable of communicating with a plurality of mobile stations located in a coverage area of the wireless network, the wireless network comprising a plurality of base stations, at least one of the base stations comprising:

a transmitter capable of producing an output signal using an input baseband signal and a carrier signal; and an adjacent channel power (ACP) monitoring circuit comprising:

a mixer capable of receiving the output signal and the carrier signal and generating a recovered baseband signal using the output signal and the carrier signal, the recovered baseband signal comprising a desired signal and ACP noise;

a first filter coupled to the mixer and capable of isolating the ACP noise in the recovered baseband signal;

a second filter coupled to the mixer and capable of isolating the desired signal in the recovered baseband signal;

a switch coupled to the first filter and the second filter and capable of selectively outputting one of the isolated ACP noise and the isolated desired signal; and a power detection circuit coupled to the switch and capable of measuring a power level of the isolated ACP noise and measuring a power level of the isolated desired signal.

12. The wireless network of claim 11, wherein:

the first filter comprises a high-pass filter; and the second filter comprises a low-pass filter.

13. The wireless network of claim 11, wherein at least one the first and second filters comprises one or more bandpass filters.

14. The wireless network of claim 11, further comprising an interface circuit capable of receiving the measured power levels and calculating a ratio of the power level of the isolated ACP noise to the power level of the isolated desired signal.

* * * * *